United States Patent
Ruiz (10) Patent No.: US 10,082,994 B1
(45) Date of Patent: Sep. 25, 2018

(54) SYSTEM AND METHOD FOR CLOUD-BASED DOCUMENT CONTENT COLLABORATION WITH SCHEDULED PRINTING

(71) Applicants: Kabushiki Kaisha Toshiba, Minato-ku (JP); Toshiba TEC Kabushiki Kaisha, Shinagawa-ku (JP)

(72) Inventor: Adiel O. Ruiz, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/466,245

(22) Filed: Mar. 22, 2017

(51) Int. Cl.
G06F 3/12 (2006.01)
G06F 17/24 (2006.01)
H04N 1/00 (2006.01)

(52) U.S. Cl.
CPC .......... *G06F 3/1261* (2013.01); *G06F 3/1208* (2013.01); *G06F 3/1215* (2013.01); *G06F 3/1274* (2013.01); *G06F 17/24* (2013.01); *H04N 1/00244* (2013.01); *H04N 2201/0094* (2013.01)

(58) Field of Classification Search
CPC ...... G06F 17/24; G06F 3/1285; G06F 3/1237; G06F 19/3406; G06F 21/608; G06F 3/1224; G06F 3/1273; G06F 3/1296; H04N 21/237; H04N 21/4788; H04N 1/00485; H04N 2201/0094; H04N 1/32272; H04N 21/454

USPC .... 358/1.15, 1.13, 1.14, 1.18; 709/204, 203, 709/207, 224, 228, 246
See application file for complete search history.

(56) References Cited

U.S. PATENT DOCUMENTS

| | | | |
|---|---|---|---|
| 6,654,032 B1 * | 11/2003 | Zhu | G06Q 10/10 709/204 |
| 7,038,796 B1 * | 5/2006 | Gupta | H04N 1/00209 358/1.15 |
| 7,084,997 B2 * | 8/2006 | Clough | G06F 3/1204 358/1.13 |
| 7,257,767 B1 * | 8/2007 | Carden, Jr. | G06F 17/2264 707/999.009 |
| 9,025,192 B1 * | 5/2015 | Majid | G06F 3/1204 358/1.15 |
| 9,671,986 B2 * | 6/2017 | Majid | G06F 3/1226 |

(Continued)

*Primary Examiner* — Negussie Worku
(74) *Attorney, Agent, or Firm* — Ulmer & Berne LLP (57) ABSTRACT

A system and method for networked document editing and printing includes a cloud server communicating with a plurality of remote computing devices via a network interface. The server stores a word processing application and receives identifiable login requests from the remote computing devices. The server receives an electronic document under direction of one of the plurality of remote computing devices and defines a document workgroup. The server receives a print schedule, defining a target print date, from a remote computing device. The server generates a remote document editing interface on the remote computing devices in accordance with a word processor application. The server receives and processes edits to the electronic document from the remote computing devices via associated remote document editing interfaces and generates a corresponding updated electronic document. The server to sends the updated electronic document to an associated printer in accordance with the print schedule.

20 Claims, 5 Drawing Sheets

(56) References Cited

U.S. PATENT DOCUMENTS

| | | | |
|---|---|---|---|
| 2001/0017707 A1* | 8/2001 | Lee | G06F 17/30867 |
| | | | 358/1.12 |
| 2010/0107060 A1* | 4/2010 | Ishizuka | G06Q 10/109 |
| | | | 715/255 |
| 2011/0075200 A1* | 3/2011 | Goldwater | G06F 3/1205 |
| | | | 358/1.15 |
| 2013/0063774 A1* | 3/2013 | Nuggehalli | G06F 3/1207 |
| | | | 358/1.15 |
| 2013/0212250 A1* | 8/2013 | Kleppner | G06Q 10/10 |
| | | | 709/224 |
| 2013/0346361 A1* | 12/2013 | Hashimoto | G06F 17/30115 |
| | | | 707/609 |
| 2014/0245138 A1* | 8/2014 | Prabhakaran | G06F 17/212 |
| | | | 715/274 |
| 2015/0242168 A1* | 8/2015 | Yu | G06F 3/1208 |
| | | | 358/1.13 |
| 2015/0242371 A1* | 8/2015 | Yu | G06F 17/24 |
| | | | 715/274 |
| 2016/0110036 A1* | 4/2016 | Baumgartner | G06Q 10/10 |
| | | | 715/741 |
| 2017/0353466 A1* | 12/2017 | Weaver | H04L 63/101 |
| 2017/0372269 A1* | 12/2017 | Williams | G06Q 10/1095 |

* cited by examiner

SYSTEM AND METHOD FOR CLOUD-BASED DOCUMENT CONTENT COLLABORATION WITH SCHEDULED PRINTING

TECHNICAL FIELD

This application relates generally to multifunction peripherals. The application relates more particularly to networked document editing and printing.

BACKGROUND

Documents are routinely created and edited on digital devices, such as desktop computers. When a hard copy output is desired, an electronic document may be sent to a printer connected to the computer via any suitable wireless or wired protocol. Examples include printer connection via a universal serial bus (USB) port, FIREWIRE, APPLE LIGHTNING, BLUETOOTH or optical. In larger operations, computers may be connected via a network to a shared printing device, such as a multifunction peripheral (MFP) which may also allow copying, scanning or faxing.

Certain print jobs may be outside the capabilities of an attached printer, or even those of a relatively powerful MFP. For example print jobs may require color printing, stapling, collating or binding which are not available functions on all MFPs. In some instances, large print jobs, such as those requiring many pages or many copies can be undesirable for local rendering. They may require long periods of printer usage making it unavailable to other users. They may require multiple refills of paper to a paper feeder, or they may use too much ink or toner from local reserves. Other jobs may require print stock that is not available locally. Situations such as these have led to establishment of third party printing services. Electronic documents may physically transported to a third party print service location via portable data storage, such as flash memory, or CD or DVD disks. A document may also be communicated remotely via a web interface or e-mail attachment to a third party print service.

SUMMARY

In accordance with an example embodiment a system and method for networked document editing and printing includes a cloud server communicating with a plurality of remote computing devices via a network interface. The server stores a word processing application and receives identifiable login requests from the remote computing devices. The server receives an electronic document under direction of one of the plurality of remote computing devices and defines a document workgroup. The server receives a print schedule, defining a target print date, from a remote computing device. The server generates a remote document editing interface on the remote computing devices in accordance with a word processor application. The server receives and processes the electronic document from each of the plurality of remote computing devices via each remote document editing interface and generates a corresponding updated electronic document. The server sends the updated electronic document to an associated printer in accordance with the print schedule.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Third party printing services are often advantageously used for reasons such as those noted above. However, several problems may arise with the use of such print services. A particular job may take a service some time to complete, even with relatively robust print capabilities. Also, a particular print service may be experiencing a high demand for its services, leaving a queue of jobs that must wait for processing. If a user sends a job to a third party print service, they may learn that their job cannot be processed fast enough to meet the user's deadlines. The user may find that their chosen print service does not have the rendering capabilities needed to complete the user's job as needed. The user can go the process of identifying other candidate printing services. However, they may find that one or more of these alternatives is either committed to processing other jobs first, or that they too lack capabilities to process the user's job as needed.

The problems noted above can be even more exacerbated when multiple users are engaged in a collaborative effort to create a document. A document must be passed along among individuals, or may be available on a networked document sharing system. When multiple users are involved, it can be difficult to set a time for cutoff of document edits. This can be critical, such as when a third party printing service will need time in advance of a user's print deadline to complete a job.

Example embodiments herein provide a mechanism by which users can collaborate in document creation via a networked content processing server. A user inputs a deadline for printing and the ensuing electronic document is made available to networked users for editing. The user selects a suitable third party printing service in advance of their print deadline. The printing service can preview the electronic document to estimate how much processing time will be required to complete the job, along with the user's target date for printing. The printing service can set a cutoff date and time for document editing completion in order to make the user's printing schedule. The printing service may also budget or allocate its resources in advance, taking into consideration the user's deadlines. When collaborators complete their edits, they may notify the content processing server. If time remains before the cutoff time, the content processing server can send the job to the third party printing service with sufficient time to complete the print job in advance of the user's deadline. This submission may be automatic, or triggered when a user informs the content processing server that all edits are complete.

Figure 1:
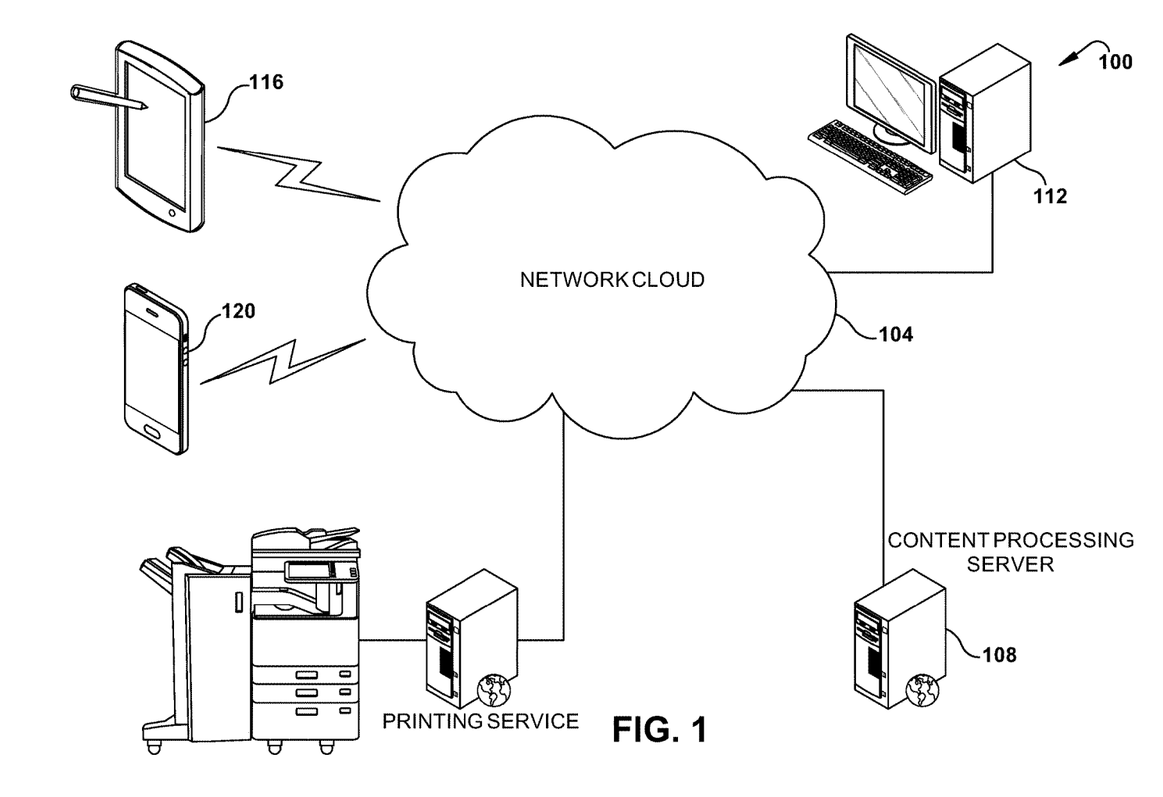
FIG. 1 is an example embodiment of a networked document rendering system.

Referring to FIG. 1, illustrated is an example embodiment of a networked document rendering system 100. Included is network cloud 104, suitably comprised of a local area network (LAN), a wide area network (WAN), which may include the INTERNET, or any suitable combination thereof. Document processing collaborators suitably access content processing server 108 via any suitable computing device, such as workstation 112, tablet computer 116, smartphone 120, or any other suitable device. Content processing server 108 can receive electronic documents, create a new electronic document, receive user edits to an existing electronic document, or send electronic documents to a printing service via an associated network interface. Content processing server 108 suitably includes a collaborative word processor that is distributable among users, such as via a web-based interface generated on each user device. User's may log into content processing server 108 and inform it as to which users are engaged with any particular electronic document. This is suitably done by one user specifying an edit group, or individual users associating themselves with other users or electronic documents. Content processing server 108 suitably maintains a user list for each electronic document and gives them access to viewing or editing a document in accordance with user login information.

Figure 2:
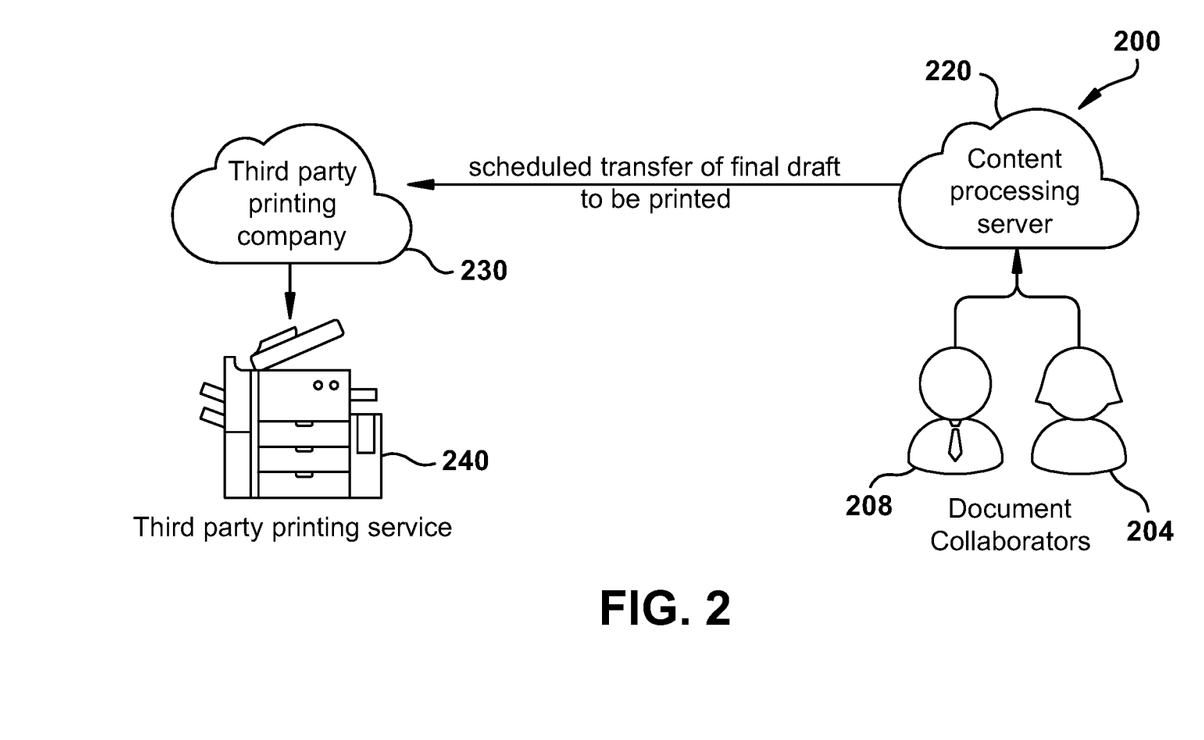
FIG. 2 is an example embodiment of collaborative document creation and printing system.

Referring next to FIG. 2, illustrated is an example embodiment of a collaborative document creation and printing system 200. Two or more users, such as users 204 and 208 collaborate in the creation or editing of electronic document housed on content processing server 220. A scheduled print date causes the user's electronic document to be communicated to a third party printing company 230 with sufficient time for completing the print job in advance of the user's deadline. As noted above, the third party printing company 230 may have pre-examined one or more versions of the user's electronic document to estimate or re-estimate when the document must be received to make the user's deadline. Any such updated deadline may be communicated to content processing server 220 which, in turn, can relay it to individual users 204, 208. As noted above, third party printing company 230 may also budget or reserve resources in advance of the deadline as needed, and may use this budget information to assist in scheduling resources for jobs submitted by other users, or other groups of users. Once a job is completed with all edits, it can be communicated for rendering, such as via third party printing service 240, which may be part of third party printing company 230, or by another rendering firm.

Figure 3:
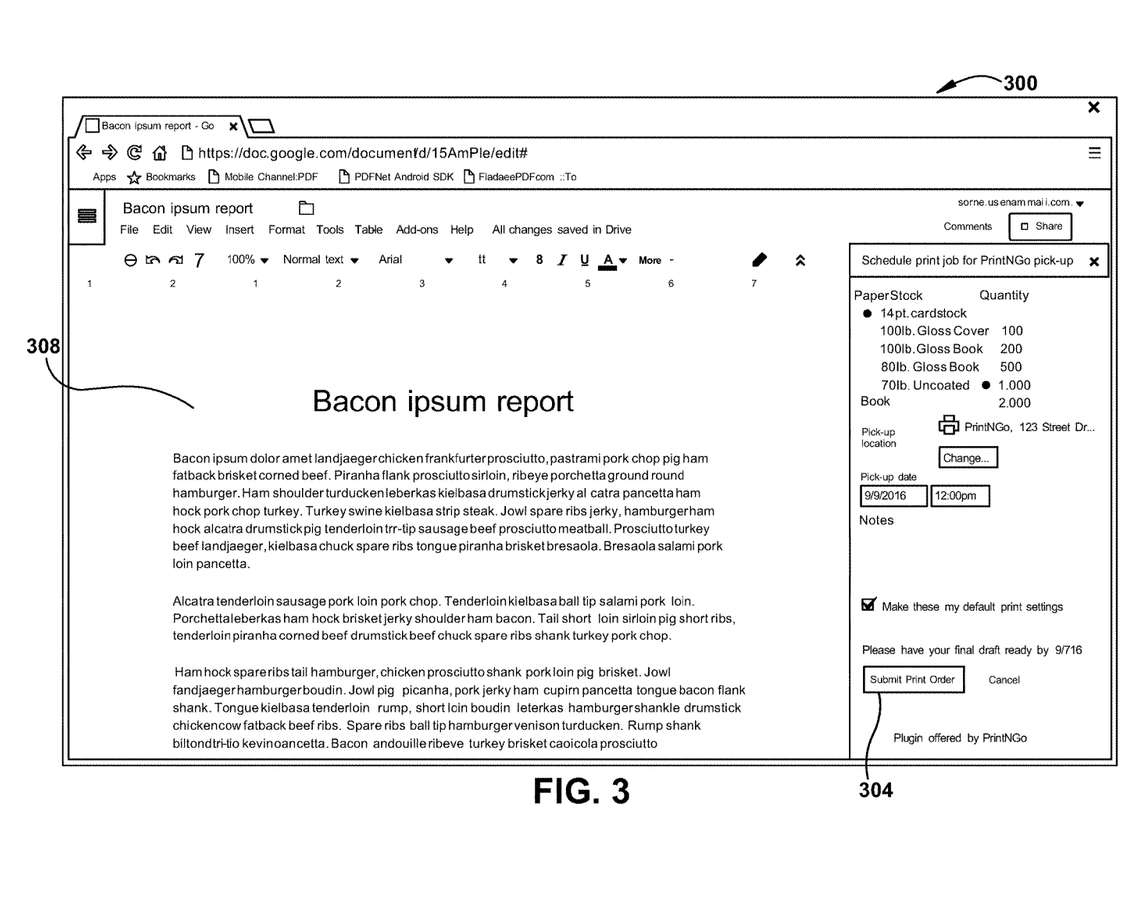
FIG. 3 is an example embodiment of a remote document editing interface.

Referring next to FIG. 3, illustrated is an example embodiment of a remote document editing interface 300, such as that which is output by a content processing server and generated on a user's device display, such as via a web browser. A rendering 308 of the user's electronic document is editable via a document processor interface analogous to word processing programs such as Microsoft WORD, Corel WORDPERFECT, etc. The content processing server suitably generates print output control field 304 to facilitate user selection of document output properties that will be used by a printing service.

Figure 4:
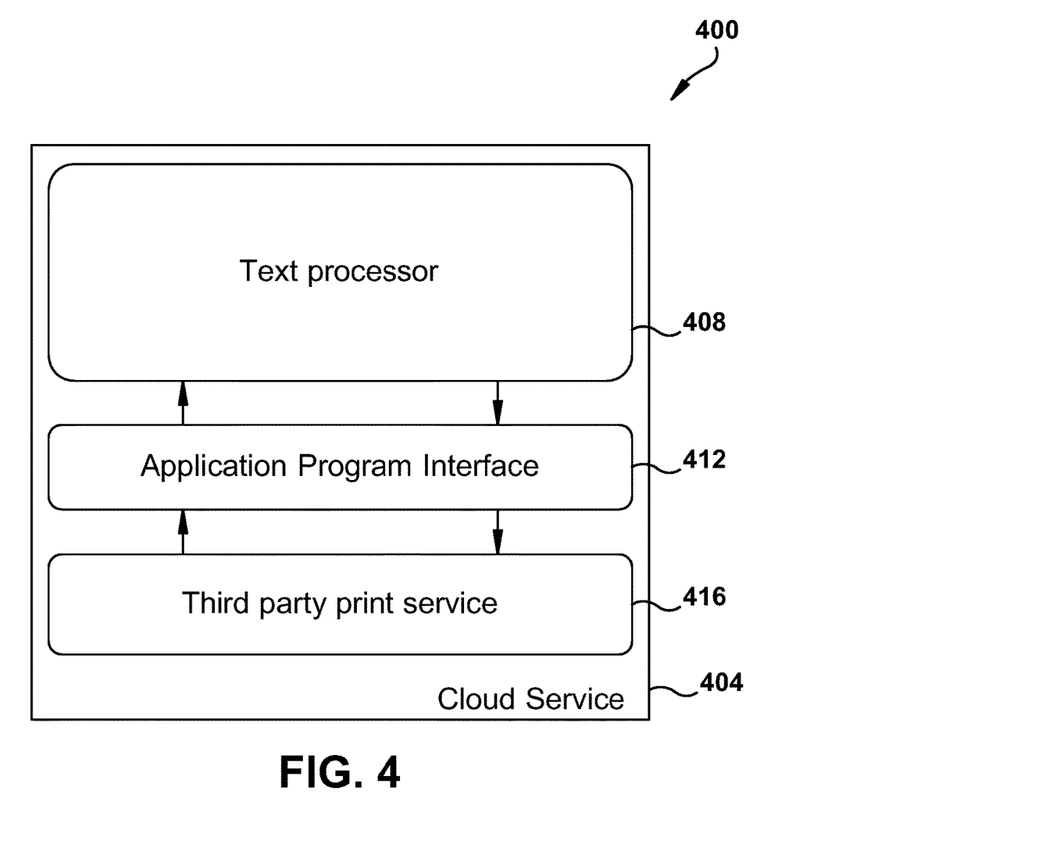
FIG. 4 is a block diagram of example software modules.

FIG. 4 illustrates a block diagram of software modules 400 for operation of a suitable content processing server. Cloud service 404 includes a text processor module 408, which interfaces with application program interface 412 to any suitable third party print service plugin 416.

Figure 5:
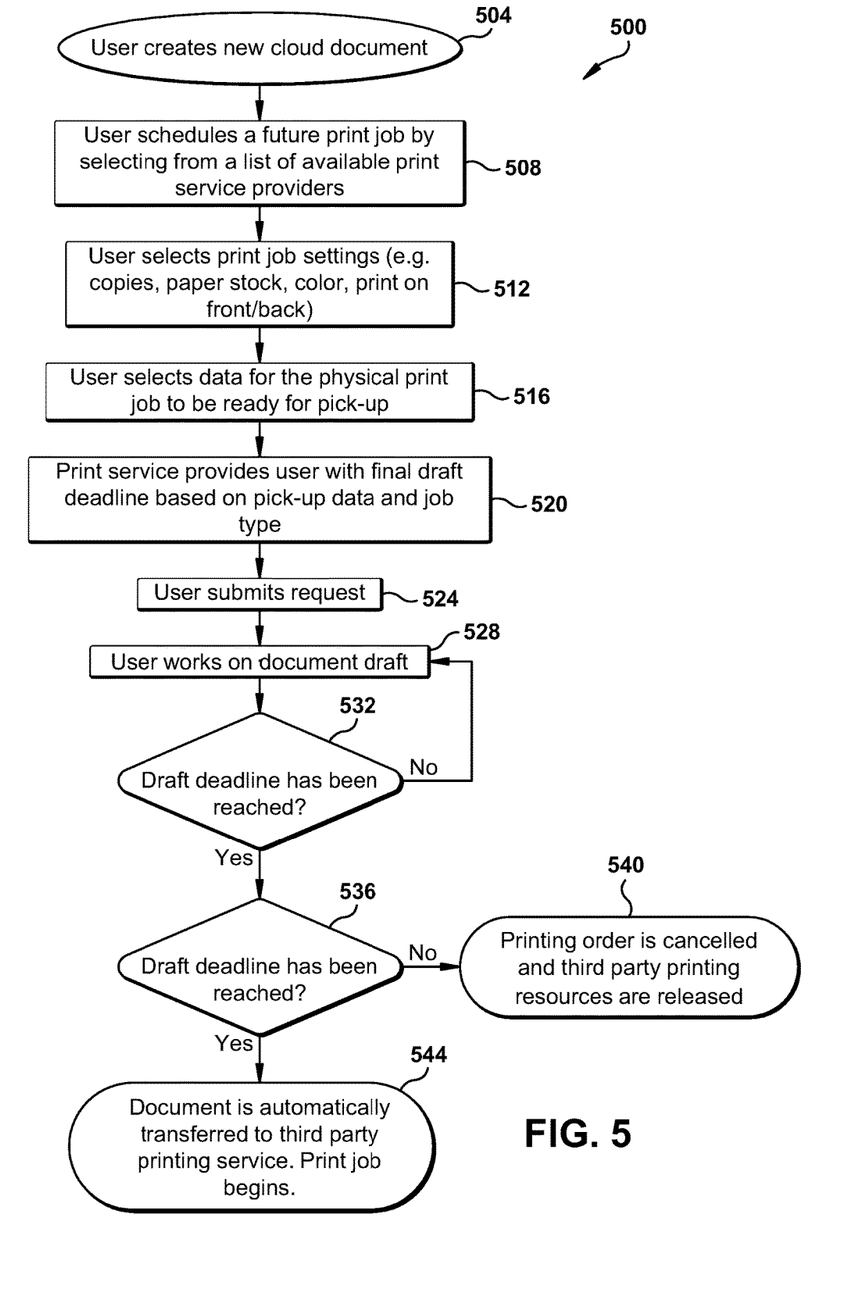
FIG. 5 is a flowchart an example embodiment of cloud-based collaborative document creation.

FIG. 5 is a flowchart 500 of an example embodiment of cloud-based collaborative document creation, editing and printing. The process commences when a user creates a new cloud document at block 504. Alternatively, a user can upload a document or call on an associated library of documents to commence a collaborative session. Next, a user schedules a future print job by selecting from a list of available print services generated for the user at block 508. A user selects print jobs settings at block 512 and a print job pickup date at block 516. The print service provides a user with a final draft deadline at block 520 based on the pickup date and job type which the print service can determine by prior review of an electronic document. A user submits a job request at block 524. The users work on the draft electronic document at block 528 until the draft deadline has been reached as determined at block 532. If the deadline is reached and it is determined that the document is not complete at block 536, then the print order is cancelled at block 540 and any allocate print resources may be reallocated to other jobs. If editing is complete, the document is transferred to a printing service at block 544 for rendering.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:

a network interface; and a processor and associated memory, the processor operative to communicate with a plurality of remote computing devices via the network interface, and wherein the memory is operative to store a word processing application, wherein the processor is further operative to receive login requests from each of the plurality of remote computing devices, each login request including corresponding identification data, wherein the processor is further operative to receive an electronic document under direction from one of the plurality of remote computing devices via the network interface, wherein the processor is further operative to define a workgroup in accordance with the received electronic document and each of the plurality of remote computing devices in accordance with received identification data, wherein the processor is further operative to receive print schedule data, defining a target print date, from one of the plurality of remote computing devices via the network interface, wherein the processor is further operative to generate, via the network interface, a remote document content editing interface to each of the plurality of remote computing devices in accordance with the word processor application, wherein the processor is further operative to receive content edits to the received electronic document from one or more of the plurality of remote computing devices via an associated remote document editing interface after receipt of the print schedule data and in advance of the target print date, wherein the processor is further operative to generate an updated electronic document by application of received edits to the received electronic document, and wherein the processor is further operative to send the updated electronic document to a printer in accordance with the print schedule data.

2. The system of claim 1 wherein the processor is further operative to send the updated electronic document, via the network interface, to the printer at a networked print service.

3. The system of claim 2 wherein the processor is further operative to receive, via the network interface, print service request data from one of the plurality of remote computing devices, the print service request data specifying the networked print service.

4. The system of claim 3 wherein the processor is further operative to receive approval data indicative of completion of final edits to the electronic document, and wherein the processor is further operative to send the updated electronic document to the networked print service in accordance with received approval data.

5. The system of claim 4 wherein the processor is further operative to send the electronic document to the networked print service via the network interface in advance of the target print date, wherein the processor is further operative to receive from the networked print service lead time data corresponding to a lead time required by the print service in accordance properties of the electronic document, and wherein the processor is further operative to communicate data indicative of a cutoff time for editing of the electronic document in accordance with received lead time data.

6. The system of claim 5 wherein the processor is further operative to abort sending of the updated electronic document to the print service in the absence of received approval data as of the cutoff time.

7. The system of claim 6 wherein the processor is further operative to send data corresponding to a list of available networked printing services to a remote computing device, and wherein the print service request data is selected from the list.

8. A method comprising:
communicating data with a plurality of remote computing devices in accordance with a processor and associated memory via a network interface;
storing a word processing application in the memory;
receiving login requests from each of the plurality of remote computing devices, each login request including corresponding identification data;
receiving an electronic document under direction of one of the plurality of remote computing devices via the network interface;
defining a workgroup in accordance with the received electronic document and each of the plurality of remote computing devices in accordance with received identification data;
receiving print schedule data, defining a target print date, from one of the plurality of remote computing devices via the network interface;
generating, via the network interface, a remote document editing interface to each of the plurality of remote computing devices in accordance with the word processor application;
receiving edits to content of the received electronic document from each of the plurality of remote computing devices via each remote document editing interface after receiving the print schedule data;
generating an updated electronic document by application of received edits to the received electronic document; and
sending the updated electronic document to a printer in accordance with the print schedule data.

9. The method of claim 8 further comprising sending the updated electronic document, via the network interface, to the printer at a networked print service.

10. The method of claim 9 further comprising receiving, via the network interface, print service request data from one of the plurality of remote computing devices, the print service request data specifying the networked print service.

11. The method of claim 10 further comprising:
receiving approval data indicative of completion of final edits to the electronic document; and
sending the updated electronic document to the networked print service in accordance with received approval data.

12. The method of claim 11 further comprising:
sending the electronic document to the networked print service via the network interface in advance of the target print date;
receiving from the networked print service lead time data corresponding to a lead time required by the print service in accordance properties of the electronic document; and
communicating data indicative of a cutoff time for editing of the electronic document in accordance with received lead time data.

13. The method of claim 12 further comprising sending the updated electronic document to the print service in the absence of received approval data as of the cutoff time.

14. The method of claim 13 further comprising sending data corresponding to a list of available networked printing services to a remote computing device and wherein the print service request data is selected from the list.

15. A system comprising:
a network interface;
a processor and associated memory, the processor operative for data communication with a content processing server via the network interface,
the processor further operative to send an electronic document to the content processing server via the network interface, and
the processor further operative to receive print service candidate data corresponding to a plurality of available print services via the network interface;
a display operative to render a list of the available print services; and
a user interface operative to receive user input corresponding to a selected one of the available print services selected from a rendered list on the display, and
wherein the processor is further operative to communicate a request for the selected print service to the content processing server,
wherein the user interface is further operative to receive user target date input corresponding to target print date input via the user interface,
wherein the processor is further operative to receive a print instructions including a date for printing of the electronic document and print job parameters for printing of the electronic document;

wherein the processor is further operative to estimate resources needed to print the electronic document in accordance with the print instructions;

wherein the processor is further operative to communicate a resource estimate to the selected print service, wherein the processor is further operative to send data corresponding to the target date input to the content processing server via the network interface, wherein the processor is further operative to receive a document edit interface from the content processing server, wherein the processor is further operative to render a received document edit interface on the display, wherein the processor is further operative to receive document content edit instructions from the user via user input corresponding to a rendered document edit interface, and wherein the processor is further operative to send received document edit instructions to the content processing server.

16. The system of claim 15 wherein the processor is further operative to receive data corresponding to an edit cutoff deadline from the content processing server via the network interface.

17. The system of claim 16 wherein the processor is further operative for receipt of user input indicative of completion of editing of the electronic document via the network interface, and wherein the processor is further operative to send approval data to the content processing server in accordance with receipt of user input indicative of completion of editing.

18. The system of claim 17 wherein the processor is further operative to receive an edited electronic document from the content processing server via the network interface.

19. The system of claim 18 wherein the processor is further operative to receive print job abort alert from the content processing server when the approval data is not sent prior to the edit cutoff deadline.

20. The system of claim 19 wherein the processor is further operative to send deselection data corresponding to the selected one of the available print services in accordance with a received print job abort alert.

* * * * *